United States Patent
Poeppelmann (10) Patent No.: US 10,965,462 B2
(45) Date of Patent: Mar. 30, 2021

(54) CONDUCTING A CRYPTOGRAPHIC OPERATION

(71) Applicant: Infineon Technologies AG, Neubiberg (DE)

(72) Inventor: Thomas Poeppelmann, Munich (DE)

(73) Assignee: Infineon Technologies AG, Neubiberg (DE)

( * ) Notice: Subject to any disclaimer, the term of this patent is extended or adjusted under 35 U.S.C. 154(b) by 332 days.

(21) Appl. No.: 16/040,971

(22) Filed: Jul. 20, 2018

(65) Prior Publication Data

US 2019/0044720 A1    Feb. 7, 2019

(30) Foreign Application Priority Data

Aug. 7, 2017 (DE) .................... 102017117907.0

(51) Int. Cl.
    *H04L 29/06*    (2006.01)
    *H04L 9/30*     (2006.01)
    *H04L 9/00*     (2006.01)
    *H04L 9/08*     (2006.01)

(52) U.S. Cl.
    CPC ............ *H04L 9/3093* (2013.01); *H04L 9/002* (2013.01); *H04L 9/0869* (2013.01); *H04L 9/3026* (2013.01); *H04L 2209/08* (2013.01)

(58) Field of Classification Search
    CPC ....... H04L 9/008; H04L 9/3093; H04L 9/002; H04L 9/0869; H04L 9/3026; H04L 2209/08
    See application file for complete search history.

(56) References Cited

U.S. PATENT DOCUMENTS

| 2013/0216044 A1* | 8/2013 | Gentry | H04L 9/008 380/277 |
| 2017/0134157 A1* | 5/2017 | Laine | G09C 1/00 |
| 2018/0212750 A1* | 7/2018 | Hoffstein | G06F 17/16 |

FOREIGN PATENT DOCUMENTS

EP    0920753 B1    12/2006

OTHER PUBLICATIONS

German Patent Office, Office Action issued for DE 102017117907.0, 12 pgs., dated Mar. 1, 2018.
D. Catalano, et al., "The Hardness of Hensel Lifting: The Case of RSA and Discrete Logarithm", 12 pgs., Springer, 2002.
S. Srinivasan, "Modulo Transforms—An Alternative to Lifting", 29 pgs., Microsoft Digital Media, 2005.

* cited by examiner

*Primary Examiner* — Yogesh Paliwal
(74) *Attorney, Agent, or Firm* — Schiff Hardin LLP (57) ABSTRACT

A method for conducting an operation including (a) lifting coefficients of a data structure from a representation modulo q to a representation modulo q', wherein the data structure comprises values which are reduced modulo q, wherein q and are integers; (b) randomizing the coefficients in modulo q', wherein for each coefficient a random value is multiplied with the value of q and the result of this multiplication is added to the coefficient; (c) conducting an operation on the lifted and randomized coefficients; and (d) reducing the lifted and randomized coefficients by conducting an operation modulo q.

19 Claims, 2 Drawing Sheets

CONDUCTING A CRYPTOGRAPHIC OPERATION

BACKGROUND

Embodiments of the present disclosure relate to an approach to efficiently conducing a cryptographic operation, in particular to improve the robustness of such operations against side-channel attacks.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF THE PREFERRED EMBODIMENTS

There is a general motivation to move away from classical asymmetric cryptosystems (RSA/ECC) to schemes which cannot be successfully attacked by quantum computers. Even if currently quantum computers are not available due to the technical complexity and engineering challenges, they might be able to break RSA and ECC in polynomial time. For example, standardization bodies like NIST (National Institute of Standards and Technology) investigate alternative cryptosystems.

One class of schemes that are supposed to resist attacks by quantum computers are lattice-based public key encryption, key exchange, or signature schemes. They might become the successor of RSA and ECC and either operate on large matrices (standard lattices) or on polynomial rings (ideal lattices). For lattice-based cryptography, reference is made to, e.g., https://en.wikipedia.org/wiki/Lattice-based_cryptography.

However, not much is known with regard to the protection of such signature schemes against implementation attacks. Especially, countermeasures against side-channel attacks are required when these signature schemes are executed on a secure chip card controller or in any adverse environment.

Lattice-based cryptography is a cryptographic system whose security is based on the hardness or related to the hardness of certain mathematically hard problems in lattices. A lattice is a structure that is created by integer linear combinations of basis vectors. Thus a lattice can be described as a regular structure in an n dimensional space. In this n dimensional space certain fundamental problems, like finding a short basis or a short vector are mathematically hard. Usually the hardness of breaking a lattice-based cryptosystem can be reduced or related to the hardness of solving such a fundamental problem.

The following abbreviations and references are used herein:

q is an integer,
q' is an integer,
k is an integer,
r is an integer (randomly selected),
$v_i$ is a coefficient of a vector or polynomial at a position i,
$r_i$ is a random value for the coefficient $v_i$,
$Z_q$ is the ring of integers modulo q which is the quotient ring Z/qZ of equivalence classes of integers modulo q,
$Z_{q'}$ is a ring of integers modulo q',
Z[x]/(f) is a ring of integer polynomials modulo f; elements v∈Z[x]/(f) can be represented by integer polynomials of a degree less than the integer n or alternatively as a vector of coefficients v∈$Z^n$,
$Z_q$[x]/(f) is a ring of integer polynomials modulo both the polynomial f and the integer q; the elements v∈$Z_q$[x]/(f) can be represented by integer polynomials of degree less than n with coefficients reduced modulo q or alternatively as a coefficient vector v∈$Z_q^n$,
x is the indeterminate,
f is a polynomial of maximum degree of integer n,
n is an integer indicating a dimension (number of coefficients),
a is a public polynomial,
s is a secret polynomial,
FFT Fast Fourier Transform,
NTT Number Theoretic Transform,
DPA Differential Power Analysis,
SPA Simple Power Analysis,
ALU Arithmetic Logic Unit.

The quotient ring is a construction in abstract algebra; for details, reference is made to, e.g., https://en.wikipedia.org/wild/Quotient_ring.

Examples described herein suggest that security-relevant computations are performed in a redundant representation in combination with coefficient-wise randomization to achieve in particular a protection against side-channel attacks.

All major computations in lattice-based cryptography may be performed modulo q. In some cases, the integer q may be selected to be a certain prime number (e.g., to enable the NTT as NTT only works in an efficient manner in case parameters are selected as certain prime numbers) or the integer q may be chosen as a power-of-two.

The solutions described herein in particular propose performing computations in the ring $Z_{q'}$ with the integer $$q'=k \cdot q$$

for a given integer k.

For example, if q=5 and k=3, q'=15. In such case, x mod q' for x=10 results in 0, also x mod q' for x=15 results in 0. Hence, several values x mod q' exist which lead to the same value modulo q and as a consequence, the value x may exist or be processed in redundant representations.

This way constants or intermediate values (coefficients of polynomials, matrices or vectors) can be randomized efficiently by randomly selecting an integer r and by adding r·q to a value in the ring $Z_{q'}$. Then (in particular security-relevant) computations can be carried out resulting in intermediate values in the ring $Z_{q'}$. In a final step, a reduction modulo q is performed on the intermediate values to obtain the result and remove the randomization.

It is noted that "random" in this regard (e.g., selecting randomly or any random value) may be a true random, a pseudo-random or a deterministic approach to obtain a value. Hence, the property of such "randomness" or any random effect according to the proposal provided herewith may be that an attacker is unaware of the value and that values are different for at least a portion of operations. The randomness in particular adds a certain level of entropy between values that are "randomly" determined, e.g., generated or selected.

When computing is executed on randomized values, invasive and non-invasive attacks with the goal of extracting a secret key or an intermediate value from a device become more difficult. Possible attacks are directed to monitoring the power consumption (DPA/SPA) or the electromagnetic emanation of a device.

Exemplary Implementation:

Currently, there exist two flavors of lattice-based cryptography, i.e. ideal lattice-based cryptograph and standard lattice-based cryptography. The approach presented herein is applicable for all sorts of lattice-based cryptography as long as values modulo q are used.

The basic operations in ideal lattice-based cryptography are polynomial multiplications, additions, or subtractions in the quotient ring $$Z_q[x]/(f),$$

where the modulus q is an integer and the dimension (number of coefficients) is an integer n.

A reduction of the polynomial might be achieved by reducing "modulo the polynomial f". An exemplary value for f is $$f = x^n + 1 \text{ or } f = x^n - 1,$$

but other polynomials may be used accordingly.

Operations in standard lattice-based cryptography comprise matrix-matrix multiplications, matrix-vector multiplications, or vector additions and subtractions where coefficients are values in the ring of integers modulo q.

When using the approach described herein, every coefficient of a matrix or polynomial in the ring $Z_{q'}$ has several representations that each corresponds to one representation in the ring $Z_q$. The representations in the ring $Z_{q'}$ are difficult to distinguish by an attacker in case a suitable randomization is applied.

Figure 1:
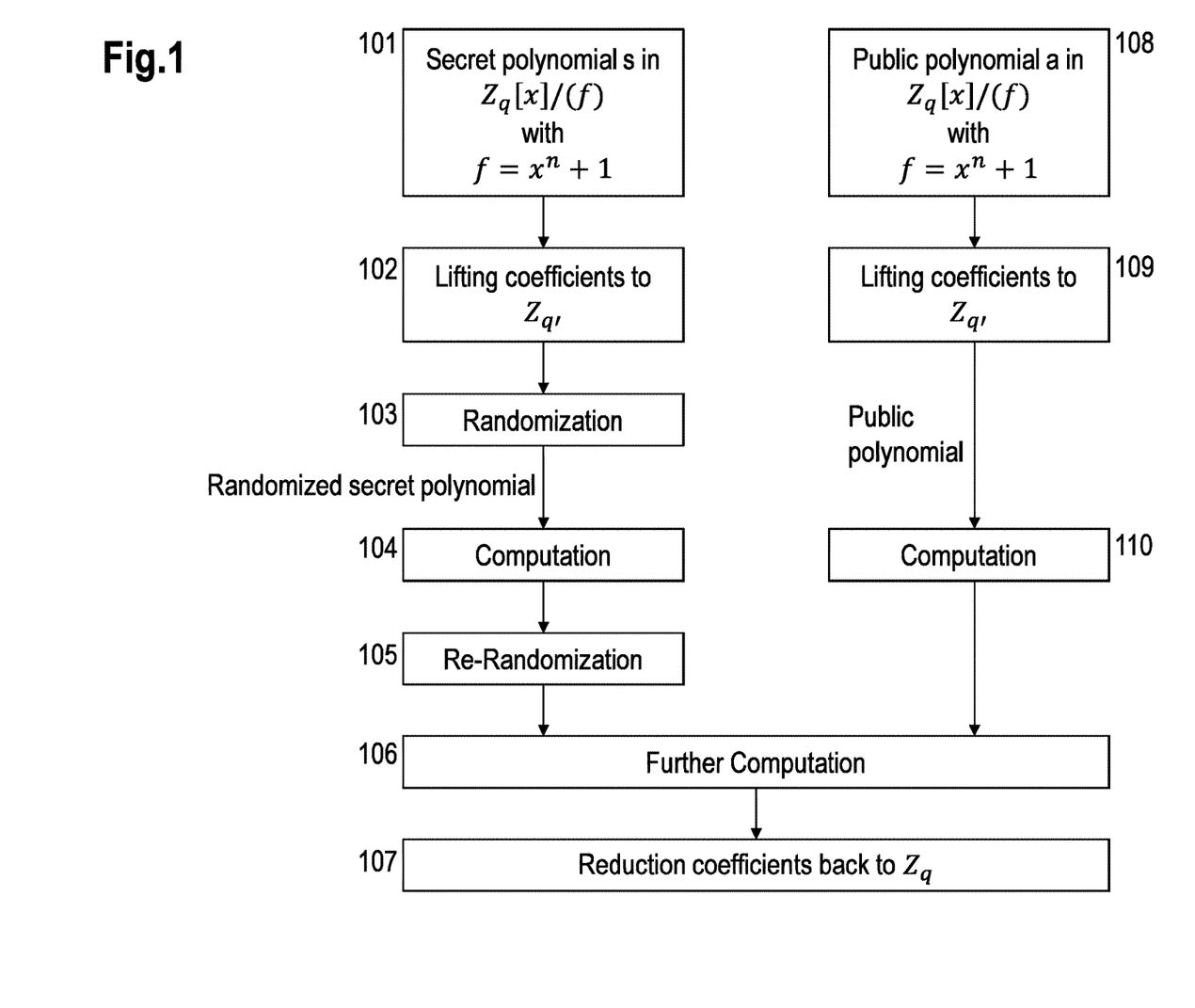
FIG. 1 shows an exemplary diagram comprising steps to achieve a protection against side channel attacks.

FIG. 1 shows an exemplary diagram comprising steps to achieve a protection against side channel attacks. A modulus q is given. The integer k is selected depending on the required level of protection.

A step 101 provides a secret polynomial s in the ring $Z_q$ [x]/(f), wherein the polynomial f is exemplarily defined as $f = x^n + 1$.

A step 102 comprises a lifting operation which moves coefficients of a polynomial, matrix, or vector from their representation modulo q to a representation modulo q'. In this example, lifting is conducted for the secret polynomial s. This lifting operation may require an allocation of memory space for coefficients due to the fact that the representation modulo q' requires more memory compared to the representation modulo q.

A step 103 comprises a randomization operation: For each coefficient $v_i$, a random value $r_i$ is determined. The random value $r_i$ is multiplied with the integer q and the result $r_i \cdot q$ is added to the coefficient $v_i$. The coefficient $v_i$ may be a coefficient of a matrix, vector or polynomial. The output of this step 103 is a randomized secret polynomial.

A step 104 comprises a computation that can be carried out utilizing known algebraic, polynomial, matrix and/or vector arithmetic using modulus q'. This approach may in particular be applicable for FFT and/or NTT operations.

Advantageously, an attacker observing the computation (analyzing, e.g., power, timing, electromagnetic emissions) is not able to determine a pattern due to the randomization operation.

An optional step 105 comprises a re-randomization operation in which the randomization operation is applied to an already randomized intermediary result. This allows introducing an additional layer of randomness.

An optional step 106 may conduct a further computation similar to or different from step 104.

A step 107 comprises a reduction step that moves all values in the ring $Z_{q'}$ back into the ring $Z_q$ by performing a computation modulo q.

In contrast to the secret polynomial s there might be a public polynomial a in the ring $Z_q$ [x]/(f) with $f = x^n + 1$ (see step 108). In a step 109 (similar to step 102) a lifting operation may be conducted on the coefficients of the public polynomial a. The output of this step 109 supplies a lifted public polynomial in the ring $Z_{q'}$. In a step 110 a computation may be carried out that is similar to or different from the computation 104. Subsequent to step 110, the step 106 and thus the step 107 are carried out for (optional) further computations and for reverting the values of the lifted public polynomial from the ring $Z_{q'}$ back to the ring $Z_q$.

In this example, the path comprising the steps 108 to 110 indicates that public information (here the public polynomial a) may not have to be protected by introducing the randomization and the optional re-randomization. This is beneficial, because of the reduced processing effort for information that does not have to be kept secret.

Further Aspects:

The efficacy of this approach may be influenced by the choice of the modulus q. The size of the modulus in lattice-based cryptography influences performance, security, and correctness of schemes, but also some freedom may be available to a designer (e.g., by balancing the size of the modulus with the size of the noise). A possible selection criterion is to choose moduli q so that they are non-sparse, i.e. have a large Hamming weight or irregular binary structure. As an example, for $$q = 2^{16} = 10000000000000000_2$$

and $$k = 30$$

the value $$10 \cdot q = 10100000000000000000_2$$

(i.e. r=10) is still considerably regular and does not impact the lower order bits when added to a coefficient.

Thus, usage of a redundant representation is significantly more efficient for non-power of two moduli or for non-sparse moduli in binary representation.

As an example, when moduli with a non-sparse representation are chosen, e.g., $$q = 87717 = 10101011010100101_2$$

a randomizing value, e.g., $$10 \cdot 87717 = 1101011000100111 0010_2$$

affects more bits of a coefficient, which makes the coefficient less predictable to an attacker.

Another criterion for the choice of the modulus q' is that the modulus q' is smaller, but very close to a specific limitation imposed by an architecture or a processor, e.g., 8-, 16-, 32-, or 64-bits for microcontrollers/microprocessors or 18- or 36-bits for FPGAs (e.g., Xilinx) The modulus q' may in particular be selected such that it matches the width of a processor (e.g., digital signal processor, DSP) and/or embedded multipliers.

The integer k and hence the integer q' can be chosen such that unused and otherwise wasted bits in a register are used for randomization purposes. In lattice-based cryptography the integer q (amounting to, e.g., 14 bits) is usually smaller than the size of a register, which may comprise, e.g., 32 bits. In hardware the ALU (multiplier, modular reduction) and registers can be scaled but otherwise the impact on the design is small. By choosing a sufficient size for k the strength of added randomness can be balanced with the required resource consumption.

In this case additional cost of the redundant representation technique are low.

Furthermore, the modulus q' can be chosen (or found by brute-force) in a way that efficient modular reduction is possible, e.g., when the modulus q' results in favorable constants in Barrett reduction or Montgomery modular multiplication.

It is also possible to switch between different values of the modulus q' based on the required protection, where large values of the modulus q' may be used for more sensitive computations.

For efficiency reasons it may be beneficial to choose the factor k (in q'=kq) in a way that random values are easy to determine, e.g., to choose the random values r between 0 and k−1. Example: If the factor k is set to 20, the random values $r_i$ may be selected between 0 and 19.

However, this might require costly rejection sampling or other steps so that the choice of a power of two for k is desirable. As an alternative, the random values $r_i$ may be sampled between zero and a power-of-two value smaller than k. Example: For k=64 sampling random values $r_i$ between 0 and 63 may be easy as it only requires removing undesired higher order bits from a stream of random bits but no rejection sampling.

It is noted that the random values r may be sampled from a distribution that is close to the uniform distribution. However, in other variants the samples could also be taken from other distributions, e.g., a (small) Gaussian distribution or a slightly skewed distribution.

In some instantiations of lattice-based cryptography coefficients of secret polynomials, matrices, or vectors may be small (e.g., −1,0,1) and sparse (lots of zero coefficients) and this sparseness could be detected by an attacker (e.g., as multiplications by zero consume less power than multiplications by 1). By performing the lifting operation and the randomization operation on sparse polynomials, matrices, or vectors, this sparseness is removed and attacks exploiting the specific shape will become harder.

The lifting operation and the randomization operation can also be integrated into the sampling of a random value and do not have to be distinct or separate operations. As an example, a common discrete Gaussian noise sampler could directly sample into the redundant representation. This means in general that the sampler may not output the noise modulo the integer q, but modulo the integer q' where the randomization has already been applied by the sampler during the sampling process. As an exemplary implementation, the sampler can first randomize the register that is going to contain a noise sample by selecting a random value r that is multiplied with the integer q and then store r·q in the register. The sampled coefficient may then directly be added to the already randomized register. This way the sampled value is not stored in a plain or non-randomized manner.

The approach presented may be implemented on ASICs, microcontrollers and/or microprocessors. It may be used to protect public key encryption or signature schemes based on lattice assumptions. In [Tim Güneysu, Vadim Lyubashevsky, Thomas Pöppelmann: Practical Lattice-Based Cryptography: A Signature Scheme for Embedded Systems. CHES 2012: 530-547] a signature scheme is described which uses q=838349 and n=512. The most critical secret key operation is the computation of polynomials $$z_1 = s_1 \cdot c + y_1$$

and $$z_2 = s_2 \cdot c + y_2,$$

where secret temporary (i.e., sampled new for each signature) polynomials $y_1$ and $y_2$ are with coefficients sampled randomly between $-2^{14}$ and $2^{14}$ and where the "·"-operation is to be interpreted as polynomial multiplication in the ring $Z_q[x]/(f)$ and the "+"-operation is to be interpreted as a polynomial addition in the ring $Z_q[x]/(f)$.

A polynomial c is a small and sparse polynomial generated from the output of a hash function (only 32 bits are set to one, the rest is set to zero). This hash function takes as input a message and a combination of a polynomial a with polynomials $y_1$ and $y_2$. This way the message is bound to the polynomials $y_1$ and $y_2$ as well as a. The polynomial c is returned to the user as part of the signature together with the polynomials $z_1$ and $z_2$. However, for security purposes, the polynomials $z_1$ and $z_2$ are processed before outputting them so that the value is independent of the secret key polynomials $s_1$ and $s_2$.

The secret key polynomials $s_1$ and $s_2$ may be small and may comprise coefficients chosen in particular randomly from −1 or 0 or 1. To protect the secret key the lifting operation and the randomization operation could be applied before each operation involving secret key polynomials $s_1$, $s_2$ or secret temporary polynomials $y_1$, $y_2$ so that the "·"-operation and "+"-operation are performed in the ring $Z_{q'}[x]/(f)$. An exemplary choice is $k=2^9$ so that q'=4292346368, i.e. $q' < 2^{32}$. This way the elements that are determined modulo still fit into a 32-bit register.

An exemplary computation of the polynomial $z_1$ could be as follows:

$$z_1 = \text{Reduction}(\text{Randomization}(\text{Lifting}(s_1)) \cdot \text{Randomization}(\text{Lifting}(c)) + \text{Randomization}(\text{Lifting}(y_1))).$$

For additional security it is also possible to store the secret key polynomials $s_1$ and $s_2$ (or any values in general) already in a redundant representation (i.e., lifted and randomized) and to perform the re-randomization operation before each secret key operation.

The approach described herein may also be used in combination with masked implementations where a secret key is split into two (preferably randomized) shares (as, e.g., proposed in [Oscar Reparaz, Sujoy Sinha Roy, Ruan de Clercq, Frederik Vercauteren, Ingrid Verbauwhede: Masking ring-LWE. J. Cryptographic Engineering 6(2): 139-153 (2016)]). This way the security of masking can be extended with the enhanced protection as described herein.

Exemplary Embodiment

The following describes details of an exemplary embodiment of the approach presented herein:
integer modulus q=12289
integer k=100
integer modulus q'=k*q=1228900
integer n=8
polynomial modulus $f=x^n-1$
input v1=[32, 4332, 41, 232, 4343, 5343, 3131, 222]
input v2=[323, 121, 534, 532, 4343, 132, 332, 32]
input v3=[0, 1, 2, 3, 1, 4, 1, 3]

As an example, a computation v1·v3+v2 is carried out. The "·"-operation is interpreted as polynomial multiplication in the ring $Z_q[x]/(f)$ that includes the reduction q. The "+"-operation is interpreted as polynomial addition in the ring $Z_q[x]/(f)$ that includes the reduction modulo q. The result of this computation is [4277, 8482, 10560, 3584, 866, 6848, 8546, 7124], which has to be checked (see below).

Exemplary steps of the approach described herein:
Computation of v1·v3+v2 using LIFTING and RANDOMIZATION into the different domain,
COMPUTATION in this domain,
RE-RANDOMIZATION after a computation, and
REDUCTION to obtain the final result (equal to the expected one).

Lifting & Randomization:
v1_lifted=[786528, 28910, 331844, 270590, 913729, 840995, 1109141, 98534]

Considering the first component of v1_lifted and v1, the lifting (and randomization) results in the value 786528 based on the value 32. This is achieved by applying 32+64*12289, wherein 64 is the random valuer and 12289 is the modulus q.

In this example, the random values r that are subject to the operation $v_i+r_i*q$ to lift v1 to v1_lifted are [64, 2, 27, 22, 74, 68, 90, 8]. The following table summarizes this operation for the components of v1_lifted and v1:

| i | $v_i$ | $r_i$ | q | $v_i + r_i*q$ |
|---|---|---|---|---|
| 0 | 32 | 64 | 12289 | 786528 |
| 1 | 4332 | 2 | 12289 | 28910 |
| 2 | 41 | 27 | 12289 | 331844 |
| 3 | 232 | 22 | 12289 | 270590 |
| 4 | 4343 | 74 | 12289 | 913729 |
| 5 | 5343 | 68 | 12289 | 840995 |
| 6 | 3131 | 90 | 12289 | 1109141 |
| 7 | 222 | 8 | 12289 | 98534 | v2_lifted and v3_lifted are determined accordingly resulting in
v2_lifted=[516461, 36988, 270892, 627271, 28921, 245912, 799117, 675927]
v3_lifted=[270358, 725052, 995411, 3, 995410, 860234, 417827, 184338]

Next, the COMPUTATION of the intermediate value $$e1\_lifted = v1\_lifted \cdot v3\_lifted$$

is conducted. When operations "+" or "·" are conducted on lifted polynomials this implies that they are to be interpreted as polynomial addition or polynomial multiplication in the ring $Z_q[x]/(f)$.

This results in:
e1_lifted=[348046, 1114371, 1128325, 728103, 660129, 842368, 1101935, 818166]

The optional RE-RANDOMIZATION of the intermediate result e1_lifted results in:
[298890, 291008, 10026, 838704, 475794, 350808, 868444, 486363]

Next is the COMPUTATION of an additional intermediate value e2_lifted as follows:
e2_lifted=e1_lifted+v2_lifted
e2_lifted=[815351, 327996, 280918, 237075, 504715, 596720, 438661, 1162290]

In the REDUCTION, the redundant representation is removed from e2_lifted, which results in
res_final=[4277, 8482, 10560, 3584, 866, 6848, 8546, 7124].

This corresponds to the result of the initial operation v1·v3+v2 as shown above.

For explanatory purposes: The first value of res_final is obtained as follows:
815351 modulo 12289=4277.
The remaining values of res_final are determined accordingly.

Hereinafter, the algorithm is shown that supplies the above results. The programming language Python is exemplarily used:

```
import random
#Common functions
def mul(a,b,modulus):
    res = [0]*(n)
    for o1,i1 in enumerate(a):
        for o2,i2 in enumerate(b):
            res[(o1+o2) % n] = (res[(o1+o2) % n] + i1*i2) % modulus
    return res
def add(res,a, modulus):
    for i in range(len(res)):
        res[i] = int((res[i] + a[i]) % modulus)
def to_mod(s1, modulus):
    res = [0]*(n)
    for i in range(len(res)):
        res[i] = s1[i] % modulus
    return res
#Lifting
def lifting(a, modulus_q, modulus_q_prime, k):
    #The polynomial a has modulus modulus_q
    #We randomize and lift to modulus_q_prime
    #We add r*q for r<k to every coefficient of a
    res = [0]*(n)
    for i in range(len(res)):
        r = random.randint(0, k)
        res[i] = (a[i] + r*modulus_q) % modulus_q_prime
    return res
#Example
#Rng is seeded with fixed value for reproducability
random.seed(42)
modulus_q = 12289
k = 100
modulus_q_prime = k * modulus_q
n = 8
print "integer modulus", modulus_q
print "k = ", k
print "integer modulus q' = k * q = ", k * modulus_q
print "integer n =", n
print "polynomial modulus f = x^n−1"
v1 = [32, 4332, 41, 232 ,4343, 5343, 3131, 222]
v2 = [323, 121, 534, 532 ,4343, 132, 332, 32]
v3 = [0, 1, 2, 3, 1, 4, 1, 3]
print "v1 =", v1
print "v2 =", v2
print "v3 =", v3
print "Compute v1*v3+v2"
e = mul(v1, v3, modulus_q)
add(e, v2, modulus_q)
print "Expected result (to check)"
print e
print ""
#Perfom the lifting. Thus randomization of the signals of v1,v2,v3
v1_lifted = lifting(v1, modulus_q, modulus_q_prime, k)
print "LIFTING & RANDOMIZATION: v1_lifted =", v1_lifted
v2_lifted = lifting(v2, modulus_q, modulus_q_prime, k)
print "LIFTING & RANDOMIZATION: v2_lifted =", v2_lifted
v3_lifted = lifting(v3, modulus_q, modulus_q_prime, k)
print "LIFTING & RANDOMIZATION: v3_lifted =", v3_lifted
#Nor perform computation on randomized signals
print "COMPUTATION of intermediate value e1_lifted=v1_lifted*v3_lifted:"
e_lifted = mul(v1_lifted, v3_lifted, modulus_q_prime)
print e_lifted
print "Optional: RE-RANDOMIZATION of intermediate result e1_lifted:"
e_lifted = lifting(e_lifted, modulus_q, modulus_q_prime, k)
```

-continued

```
print "Re-Randomized representation of e"
print e_lifted
print "COMPUTATION of additional intermediate value
  e2_lifted=e1_lifted+v2_lifted"
add(e_lifted, v2_lifted, modulus_q_prime)
print "e2_lifted =", e_lifted
print "REDUCTION: remove redundant representation"
print "The result of the computation (e2_lifted) with
  randomization removed"
print "res_final =",to_mod(e_lifted,modulus_q)
```

The examples described herein can be realized as instructions processed by a data processing device like a personal computer, microcontroller, or smart card.

Figure 2:
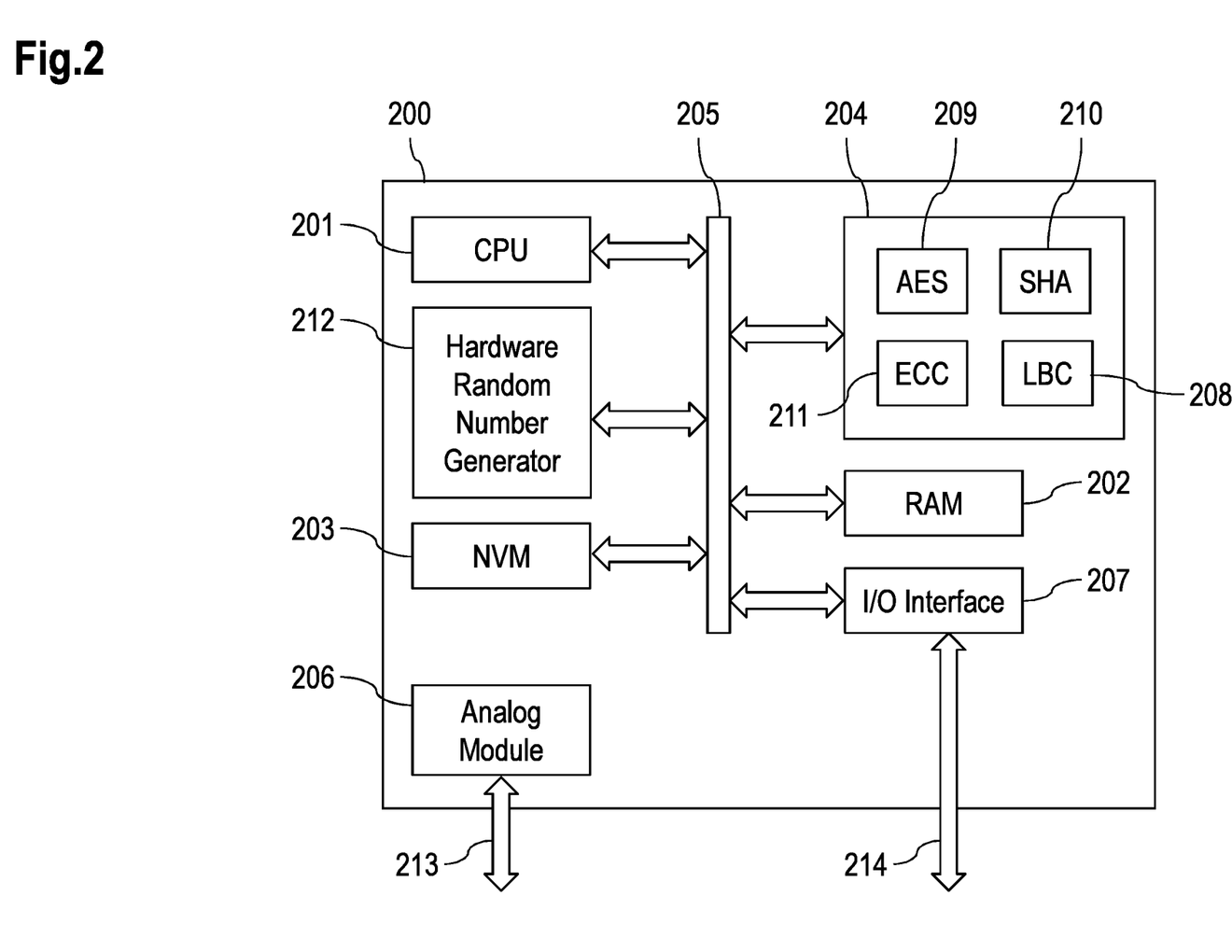
FIG. 2 shows an exemplary arrangement of a processing device comprising a CPU, a RAM, a non-volatile memory, a crypto module, an analog module, an input/output interface and a hardware-random number generator.

FIG. 2 shows a processing device 200 comprising a CPU 201, a RAM 202, a non-volatile memory 203 (NVM), a crypto module 204, an analog module 206, an input/output interface 207 and a hardware-random number generator 212.

In this example, the CPU 201 has access to at least one crypto module 204 over a shared bus 205 to which each crypto module 204 is coupled. Each crypto module 204 may in particular comprise one or more crypto cores to perform certain cryptographic operations. Exemplary crypto cores are:
- an AES core 209,
- a SHA core 210,
- an ECC core 211, and
- a lattice-based crypto (LBC) core 208.

The lattice-based crypto core 208 may be provided in order to accelerate lattice-based cryptography.

The CPU 201, the hardware random number generator 212, the NVM 203, the crypto module 204, the RAM 202 and the input/output interface 207 are connected to the bus 205. The input output interface 207 may have a connection 214 to other devices, which may be similar to the processing device 200.

The crypto module 204 may or may not be equipped with hardware-based security features.

The analog module 206 is supplied with electrical power 213 via an electrical contact and/or via an electromagnetic field. This power is supplied to drive the circuitry of the processing device 200 and may in particular allow the input/output interface to initiate and/or maintain connections to other devices via the connection 214.

The bus 205 itself may be masked or plain. Instructions to process the steps described herein may in particular be stored in the NVM 203 and processed by the CPU 205. The data processed may be stored in the NVM 203 or in the RAM 202. Supporting functions may be provided by the crypto modules 204 (e.g., expansion of pseudo random data). Random numbers are supplied by the hardware-random number generator 212.

Steps of the method described herein may exclusively or at least partially be conducted on the crypto module 204, e.g., on the lattice-based crypto core 208. For example, instructions may be stored in the lattice-based crypto core 208 or they may be provided by the CPU 201 via the bus 205. Data may be stored locally with the lattice-based crypto core 208. It is also an option that the data is temporarily stored in the RAM 202 or the NVM 203. The lattice-based crypto core 208 may also use other crypto modules to provide supporting functions (e.g., expansion of pseudo random data). The lattice-based crypto core 208 may also comprise a hardware-random number generator 212 or a means to generate physical and/or software random numbers.

The processing device 200 may be a chip card powered by direct electrical contact or through an electro-magnetic field. The processing device 200 may be a fixed circuit or based on reconfigurable hardware (e.g., Field Programmable Gate Array, FPGA). The processing device 200 may be coupled to a personal computer, microcontroller, FPGA or a smart phone.

The examples suggested herein may in particular be based on at least one of the following solutions. In particular combinations of the following features could be utilized in order to reach a desired result. The features of the method could be combined with any feature(s) of the device, apparatus or system or vice versa.

A method is suggested for conducting an operation, said method comprising:
(a) lifting coefficients of a data structure from a representation modulo q to a representation modulo q', wherein the data structure comprises values which are reduced modulo q, wherein q and are integers;
(b) randomizing the coefficients in modulo q', wherein for each coefficient a random value is multiplied with the value of q and the result of this multiplication is added to the coefficient;
(c) conducting an operation on the lifted and randomized coefficients;
(d) reducing the lifted and randomized coefficients by conducting an operation modulo q.

The operation is in particular subject to secrecy. It may in particular be a cryptographic operation or an operation that is part of a cryptographic operation.

It is noted that (a) and (b) can be combined in a single lifting and randomization step, i.e. determining the randomized coefficients in the lifted space q'.

It is also noted that the integers q and are different from each other and that q'>q.

It is further noted that in step (b) the result of the multiplication is added to the coefficient and the result of this operation is determined modulo q', which corresponds to the fact that the lifted coefficients are "lifted" to the representation modulo q'.

In an embodiment, the value of is larger than the value of q.

It is in particular an option that q multiplied by an integer k results in q', i.e. q'=k·q.

In an embodiment, the data structure comprises at least one of the following: a polynomial, a matrix or a vector.

The data structure may in particular be a polynomial f in the ring $Z_q[x]/(f)$. The polynomial f may be exemplarily defined as $f=x^n+1$ or as $f=x^n-1$.

In an embodiment, the operation is an arithmetic operation.

In an embodiment, the operation is a cryptographic operation.

In an embodiment, the operation is a lattice-based operation.

Lattice-based cryptography is a cryptographic system whose security is based on the hardness of certain mathematically hard problems in lattices. A lattice is a structure that is created by integer linear combinations of basis vectors. Thus a lattice can be described as a regular structure in an n dimensional space. In this n dimensional space certain fundamental problems, like finding a short basis or a short vector are mathematically hard. Usually the hardness of breaking a lattice-based cryptosystem can be reduced or related to the hardness of solving such a fundamental problem.

In an embodiment, the method further comprises after step (c):
- (c1) repeating steps (b) and (c) at least once before branching to step (d).

Hence, another randomization may be conducted according to step (b) with another random value is used to be multiplied with the value of q and the result of this multiplication is added to each of the coefficients that are the result of the operation conducted in step (c); then, another operation according to step (c) is conducted leading to yet another set of coefficients. After that, the reduction according to step (d) leads to (unlifted) coefficients in the representation modulo q.

In an embodiment, the data structure is a secret data structure.

In an embodiment, the value of q and/or the value of q' is a prime number or a power-of-two.

In an embodiment, the value of is selected such that it corresponds to a width of an integrated processing unit.

The width of the processing unit may be a width of a bus. The width may in particular define a number of bits that are subject of a single operation of the integrated processing unit.

The integrated processing unit may be a processor, controller, FPGA, digital signal processer or embedded adder and/or multiplier.

In an embodiment, the value of varies.

The value of q' may be selected from at least two values depending, e.g., on the level of security.

In an embodiment, the method is used for operating a processing device, in particular one of the following:
- a FPGA,
- a processing unit,
- a controller,
- a smartcard.

Also, a device is provided, wherein the device comprises
- a processing unit,
- a crypto unit,
- a bus that couples the processing unit with the crypto unit,
wherein the crypto unit is arranged to
  - (a) lifting coefficients of a data structure from a representation modulo q to a representation modulo q', wherein the data structure comprises values which are reduced modulo q, wherein q and q' are integers;
  - (b) randomizing the coefficients in modulo q', wherein for each coefficient a random value is multiplied with the value of q and the result of this multiplication is added to the coefficient;
wherein the processing unit is arranged to
  - (c) conducting an operation on the lifted and randomized coefficients;
and wherein the crypto unit is arranged to
  - (d) reducing the lifted and randomized coefficients by conducting an operation modulo q.

It is noted that the device may be a security device, which may in particular be or comprise an integrated circuit (IC), a hardware security module (HSM), a trusted platform module (TPM).

The crypto unit may be or comprise one of the following: a crypto processor, a crypto-portion of a security controller or a security-controller. The crypto unit may also comprise or be a crypto core or a crypto module.

The device may be a security controller, a dongle.

The device may in particular comprise hardware and software portions. It may in particular comprise a hardware root of trust.

It is further noted that the crypto unit may be or comprise a HSM or a TPM. It is also an option that the TPM comprises a CPU, a crypto module and crypto core.

In an embodiment, the device is a FPGA, a processing unit, a controller, a smartcard integrated circuit (smartcard IC) or a smartcard.

Also, a computer program product is suggested that is directly loadable into a memory of a digital processing device, comprising software code portions for performing the steps of the method as described herein.

In addition, the problem stated above is solved by a computer-readable medium, e.g., storage of any kind, having computer-executable instructions adapted to cause a computer system to perform the method as described herein.

Furthermore, the problem stated above is solved by a communication system comprising at least one device as described herein.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the disclosure have been disclosed, it will be apparent to those skilled in the art that various changes and modifications can be made which will achieve some of the advantages of the disclosure without departing from the spirit and scope of the disclosure. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the disclosure may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A method for conducting a cryptographic operation in a security device in a manner that increases robustness of the cryptographic operation against side-channel attacks, the method comprising:
   (a) lifting, by a hardware configured to perform cryptographic operations, coefficients of a data structure from a representation modulo q to a representation modulo q', wherein the data structure comprises values which are reduced modulo q, wherein q and q' are integers;
   (b) randomizing, by the hardware, the coefficients in modulo q', wherein for each coefficient a random value is multiplied with the value of q and the result of this multiplication is added to the coefficient;
   (c) conducting the cryptographic operation on the lifted and randomized coefficients; and
   (d) reducing, by the hardware, the lifted and randomized coefficients by conducting an operation modulo q to provide a result of the cryptographic operation.

2. The method according to claim 1, wherein the value of q' is larger than the value of q.

3. The method according to claim 1, wherein the data structure comprises a polynomial, a matrix, or a vector.

4. The method according to claim 1, wherein the cryptographic operation is an arithmetic operation.

5. The method according to claim 1, wherein the cryptographic operation is a lattice-based operation.

6. The method according to claim 1, further comprising after the step (c):
   (c1) repeating the steps (b) and (c) at least once before branching to the step (d).

7. The method according to claim 1, wherein the data structure is a secret data structure.

8. The method according to claim 1, wherein the value of q and/or the value of q' is a prime number or a power-of-two.

9. The method according to claim 1, wherein the value of q' is selected such that it corresponds to a width of an integrated processor.

10. The method according to claim 1, wherein the value of q' varies.

11. The method according to claim 1, wherein the method security device comprises a FPGA, a processor, a controller, or a smartcard.

12. A security device for conducting a cryptographic operation in a manner that increases robustness of the cryptographic operation against side-channel attacks, comprising:
   a processor;
   a hardware which is coupled to the processor by a bus, and is configured to perform cryptographic operations,
   wherein the hardware is arranged to:
      (a) lift coefficients of a data structure from a representation modulo q to a representation modulo q', wherein the data structure comprises values which are reduced modulo q, wherein q and q' are integers; and
      (b) randomize the coefficients in modulo q', wherein for each coefficient a random value is multiplied with the value of q and the result of this multiplication is added to the coefficient;
   wherein the processor is arranged to:
      (c) conduct the cryptographic operation on the lifted and randomized coefficients; and
   wherein the hardware is arranged to:
      (d) reduce the lifted and randomized coefficients by conducting an operation modulo q to provide a result of the cryptographic operation.

13. The security device according to claim 12, wherein the device is a FPGA, a processing unit, a controller or a smartcard.

14. The security device according to claim 12, wherein the security device comprises a FPGA, a processing unit, a controller or a smartcard.

15. The security device according to claim 12, wherein the security device comprises an integrated circuit (IC), a hardware security module (HSM), or a trusted platform module (TPM).

16. The security device according to claim 12, wherein the hardware comprises a crypto processor, a crypto-portion of a security controller, a security-controller, a crypto core, or a crypto module.

17. The security device according to claim 12, wherein the hardware comprises a hardware security module (HSM) or a trusted platform module (TPM).

18. The security device according to claim 17, wherein the TPM comprises a central processing unit (CPU), a crypto module, and a crypto core.

19. A non-transitory computer program product directly loadable into a memory of a digital processor, comprising software code for performing a method for conducting a cryptographic operation in a security device in a manner that increases robustness of the cryptographic operation against side-channel attacks, the method comprising:

(a) lifting, by a hardware configured to perform cryptographic operations, coefficients of a data structure from a representation modulo q to a representation modulo q' wherein the data structure comprises values which are reduced modulo q', wherein q and q' are integers;

(b) randomizing, by the hardware, the coefficients in modulo q', wherein for each coefficient a random value is multiplied with the value of and the result of this multiplication is added to the coefficient;

(c) conducting the cryptographic operation on the lifted and randomized coefficients; and (d) reducing, by the hardware, the lifted and randomized coefficients by conducting an operation modulo q to provide a result of the cryptographic operation.

* * * * *